(12) United States Patent
Rowley (10) Patent No.: US 7,937,432 B2
(45) Date of Patent: May 3, 2011

(54) STATE TRANSITION MANAGEMENT ACCORDING TO A WORKFLOW MANAGEMENT POLICY

(75) Inventor: Peter A. Rowley, Ben Lomond, CA (US)

(73) Assignee: Red Hat, Inc., Raleigh, NC (US)

( * ) Notice: Subject to any disclaimer, the term of this patent is extended or adjusted under 35 U.S.C. 154(b) by 387 days.

(21) Appl. No.: 11/707,358

(22) Filed: Feb. 16, 2007

(65) Prior Publication Data

US 2008/0201333 A1 Aug. 21, 2008

(51) Int. Cl.
*G06F 15/16* (2006.01)
(52) U.S. Cl. .............................. 709/202; 709/203; 705/9
(58) Field of Classification Search .................. 709/202, 709/203; 705/9
See application file for complete search history.

(56) References Cited

U.S. PATENT DOCUMENTS

| | | | | |
|---|---|---|---|---|
| 5,799,297 A | * | 8/1998 | Goodridge et al. | 707/1 |
| 6,041,306 A | * | 3/2000 | Du et al. | 705/8 |
| 6,981,041 B2 | * | 12/2005 | Araujo et al. | 709/224 |
| 2002/0032692 A1 | * | 3/2002 | Suzuki et al. | 707/200 |
| 2002/0046072 A1 | * | 4/2002 | Arai et al. | 705/8 |
| 2003/0061266 A1 | * | 3/2003 | Ouchi | 709/106 |
| 2003/0120502 A1 | * | 6/2003 | Robb et al. | 705/1 |
| 2004/0216039 A1 | * | 10/2004 | Lane et al. | 715/511 |
| 2006/0179028 A1 | * | 8/2006 | Bram et al. | 706/47 |
| 2006/0253314 A1 | * | 11/2006 | Reznichenko et al. | 705/9 |
| 2007/0192153 A1 | * | 8/2007 | Toyofuku et al. | 705/8 |
| 2008/0155643 A1 | * | 6/2008 | Moran et al. | 726/1 |

\* cited by examiner

*Primary Examiner* — Joseph Avellino
*Assistant Examiner* — Mohamed Wasel
(74) *Attorney, Agent, or Firm* — Blakely, Sokoloff, Taylor & Zafman LLP (57) ABSTRACT

A method, an apparatus, and a system for managing data using state transition controlled attributes have been presented. For example, a workflow management policy and a set of states are defined at a server coupled to one or more client machines, each of the states corresponding to a distinct value of a set of values of an attribute of data. The method may further include implementing a state machine on the server to manage state transitions initiated by the one or more client machines operating on the data according to the workflow management policy.

18 Claims, 4 Drawing Sheets

STATE TRANSITION MANAGEMENT ACCORDING TO A WORKFLOW MANAGEMENT POLICY

TECHNICAL FIELD

Embodiments of the present invention relate to client-server computing environment, and more specifically to managing data using state transition controlled attributes in a client-server computing environment.

BACKGROUND

A workflow in the current document generally refers to the flow or movement of data through a work process or a life cycle. In general, multiple events may occur throughout a workflow in many situations. For instance, in the context of employment within a corporation, some examples of the events may include hiring, working, terminating, etc. Moreover, some examples of events in the context of product development may include design, testing, mass manufacturing, discontinuation, etc. Typically, individual programs are developed to process data along the workflow. Referring back to the employment example above, the human resource (HR) department of the corporation may develop a program to process data of applicants and new hires, while other departments of the corporation may develop different programs to track the training and job performance of employees. Further, the data along the workflow generally has various attributes, which are properties of the data. The attributes may be changed when certain events occur. For instance, referring back to the employment example above, the data has an attribute of employment status, which takes on only one of the following values at a specific instance of time: "new hire," "active," "inactive," "terminated," etc. In the event of terminating an employee, the employment status may change from "active" to "terminated."

Further, changes of the attributes are typically constrained by the specific policy applicable, such as a HR policy of the corporation, a product development protocol/procedure, etc. Since different programs in different departments of the corporation may process and/or operate on the data along the workflow, it is difficult to coordinate the programs to ensure the applicable policies are followed. Furthermore, when there is a change in one of the applicable policies, it is time-consuming to revise every one of the programs to ensure compliance with the changed policy.

DESCRIPTION OF THE DRAWINGS

The present invention is illustrated by way of example, and not by way of limitation, in the figures of the accompanying drawings and in which.

DETAILED DESCRIPTION

Described herein is a method and apparatus to manage data using state transition controlled attributes. In one embodiment, a server defines a workflow management policy and a set of states. The server is coupled to one or more client machines. A workflow management policy generally refers to a set of rules on how data in the workflow may be manipulated and/or processed. Depending on the context of the workflow, the rules may be based on company policies, legal requirements (e.g., statutes, ordinances, etc.), business rules (e.g., product development procedures and/or protocols), etc. In general, the data in the workflow has one or more attributes. An attribute is a property of the data. The attribute may have a value selected out of a group of predetermined values. Each value of an attribute may correspond to a distinct one of the set of states. Alternatively, each combination of values of multiple attributes may correspond to a distinct state. As such, a change in the value of an attribute may correspond to a state transition. The workflow management policy governs state transitions. In other words, state transitions follow the rules of the workflow management policy.

The states and state transitions may be represented or modeled by a state machine, which may also be referred to as a finite state machine (FSM). A state machine is a tool for managing a set of states, such as tracking the current state, allowing or denying a transition from one state to another state, etc. The state machine may be implemented using software, hardware, or a combination of both. The method to manage data may further include implementing a state machine on the server to manage state transitions initiated by the one or more client machines operating on the data according to the workflow management policy. More details of the state machine and how to manage data using the state machine are discussed below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
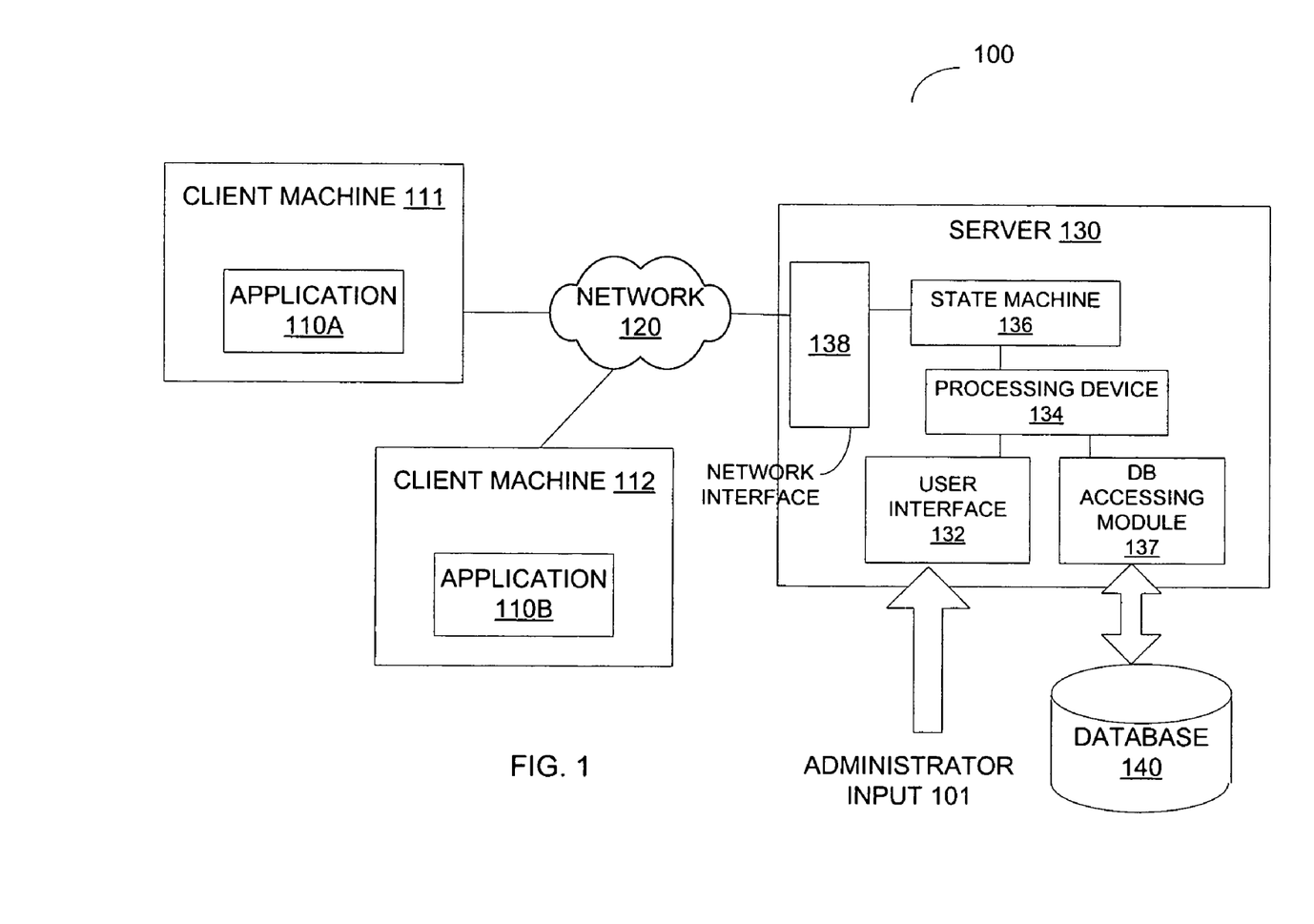
FIG. 1 illustrates an exemplary embodiment of a client-server system in which embodiments of the present invention may be implemented.

FIG. 1 illustrates an exemplary embodiment of a client-server system in which embodiments of the present invention may be implemented. The system 100 includes a number of client machines 111 and 112, a network 120, a server 130, and a database 140. Some examples of the client machines 111 and 112 include a desktop personal computer (PC), a laptop PC, a personal digital assistant (PDA), a cellular telephone or mobile telephone, etc. The client machines 111 and 112 execute applications 110A and 110B, respectively, where applications 110A and 110B may or may not be the same. The client machines 111 and 112 are coupled to the network 120. The network 120 may include various kinds of networks, such as local area network (LAN), wide area network (WAN), wireless network, wired network, etc. In addition to the client machines 111 and 112, the network 120 is further coupled to the server 130, which is further coupled to the database 140.

Note that any or all of the components and the associated hardware illustrated in FIG. 1 may be used in various embodiments of the system 100. However, it should be appreciated that other configurations of the system 100 may include more or fewer devices than those shown in FIG. 1.

In some embodiments, the server 130 includes a network interface 138, a state machine 136, a processing device 134, a user interface 132, and a database accessing module 137. The network interface 138 interfaces with the network 120 to transmit and/or receive data to/from the client machines 111 and/or 112. The data may include requests from the client machines 111 and/or 112 and responses to the requests from the server 130. The database accessing module 137 communicatively couples the server 130 to the database 140 to access data in the database 140. Some examples of the database accessing module 137 include Open Database Connectivity (ODBC) module, Java Database Connectivity (JDBC) module, etc. The database 140 may include a lightweight directory access protocol (LDAP) directory.

The server 130 further includes a user interface 132 to receive input 101 from an administrator of the system 100. Via the user interface 132, the administrator may input configuration data containing some rules applicable to a workflow, information on data of the workflow, and attributes of the data. The configuration data may be contained in a configuration file written in various languages, such as Extensible Markup Language (XML). Alternatively, the user interface 132 may include a graphical user interface (GUI) displaying various values for some configurable parameters and a user interface control to allow the administrator to select a value for each configurable parameter. In another embodiment, the user interface 132 may include a GUI displaying various predefined configurations and a user interface control to allow the administrator to select one of the predefined configurations. Then the user interface 132 sends the administrator input 101 to the processing device 134 within the server 130.

The administrator input 101, such as the configuration file, generally defines one or more attributes of data processed by the system 100. An attribute generally refers to a property of the data. For example, in the context of human resource management, the data includes employee information, which has attributes such as employment status, job locations, positions and/or titles, etc. Each attribute may take on one of a set of predefined values. For example, the attribute of positions may have a value of only one of the following: partner, associate, paralegal, secretary, and support staff. Alternatively, some attributes may take on multiple values from a set of predefined values. For example, the attribute of job locations may have one or more values from the following group: San Francisco, Los Angeles, Denver, New York, and London, because an employee may work at multiple locations. In some embodiments, the database accessing module 137 stores the attributes and the associated values in the database 140.

In addition to the attributes, the administrator input 101 may include some rules on processing the data. These rules may be based on business rules, legal requirements, safety standard, etc. Changes in the values of the attributes of the data have to comply with these rules.

The processing device 134 defines a workflow management policy and a set of states based on the administrator input 101. The workflow management policy generally includes the rules from the administrator input 101, such as business rules, legal requirements, etc. Each of the states corresponds to a distinct value of an attribute of the data. As discussed above, each attribute of the data generally may be of one of a set of values. For instance, in the context of employment within a corporation, an attribute of employment status of each employee may be one of the following values at a specific instance of time: "new hire," "training," "active," "inactive," "terminated," etc. The processing device 134 may associate each value of an attribute to a distinct state. For more complex situations, the processing device 134 may associate each combination of values of a set of attributes to a distinct state. For example, different states may be defined for different combination of employment status and employment location (e.g., a first state may be defined for employees terminated in the United States, while a second state may be defined for employees terminated in Canada), where different rules of the workflow management policy may apply. In some embodiments, a state may be associated with a distinct event. Referring back to the above example, the state of "new hire" is associated with the event of hiring a new employee, the state of "active" is associated with the event of an employee completing new hire training and/or orientation and starting active service, the state of "inactive" is associated with the event of an employee taking a leave of absence (e.g., disability leave), and the state of "terminated" is associated with an employee being terminated.

The rules of the workflow management policy may limit the way in which the values of the attributes change. In other words, only some predetermined sequences of events are allowed under the rules of the workflow management policy. In the above example in employment, the employment status of a newly hired employee may be allowed to change from "new hire" directly to "active," but not directly to "terminated." The processing device 134 may extract the relationships between the states from the administrator input 101, such as the configuration file, to define the workflow management policy. In some embodiments, the database accessing module 137 stores the workflow management policy defined in the database 140.

Based on the workflow management policy, the processing device 134 implements the state machine 136 to manage state transitions initiated by the client machines 111 and 112. Note that the state machine 136 may be implemented using software, hardware, or a combination of both. For instance, the processing device 134 may create business logic for the state machine 136 based on the relationships between the states. Referring back to the above example, the processing device 134 may create some of the business logic using the following pseudocode:

```
If employment_status = "new hire"
If new_employment_status = "terminated"
    return "request denied"
```

Then the processing device 134 may compile and execute the code of the business logic to build the state machine 136.

When a client machine (e.g., the client machines 111 and 112) attempts to change a value of an attribute of the data during processing of the data, the client machine submits a request to the server 130 via the network 120. Note that the client machine may or may not be aware of the states defined by the server 130. In one embodiment, the client machine is aware of the states and thus, the client machine includes in the request to the server 130 the current state corresponding to the current value of the attribute and the new state corresponding to the proposed new value of the attribute. In an alternate embodiment, the client machine is not aware of the states and thus, the client machine sends the request specifying the current value of the attribute and the proposed new value of the attribute to the server 130 without referring to the corresponding states. Alternatively, the client machine may just provide the proposed new value of the attribute to the server 130, which may keep track of the current value of the attribute. Then the server 130 determines the current state of the attribute and decides whether the requested state transition is allowed.

The server 130 receives the request via the network interface 138, which forwards the request to the state machine 136. If the request does not specify any states, the state machine 136 may determine if the request pertains to an attribute associated with some predefined states. If so, then the state machine 136 may determine a first state corresponding to the current value of the attribute and a second state corresponding to the proposed new value of the attribute. Then the state machine 136 verifies the requested state transition to determine if the requested transition would violate the workflow management policy. If so, the state machine 136 denies the request. Otherwise, the state machine 136 approves the request. An approval response may be sent to the requesting client machine from the server 130 via the network interface 138 and the network 120. Upon receiving approval from the server 130, the requesting client machine may go ahead to effect the transition by changing the value of the attribute.

Alternatively, the client machine is ignorant of the state machine implemented by the server 130. Then the client machine may attempt to update an attribute by sending an instruction (e.g., a LDAP instruction) to the server 130. In response to the instruction, the server 130 uses the state machine 136 to determine if the corresponding state transition is allowed. If the state transition is allowed, the server 130 performs the operation to change the value of the attribute. Otherwise, the server 130 returns an error code to the client machine.

It should be appreciated that in more complex situations, each state of the state machine 136 may correspond to a combination of values of multiple attributes. The client machines 111 and 112 may request to change the values of multiple attributes.

As time goes by, the initial workflow management policy defined may have to be updated to comply with changes in business rules, company policies, legal requirements, etc. In some embodiments, the administrator may modify the workflow management policy via the user interface 132. For instance, the administrator may add or delete an attribute value. Using one of the above examples, the office in San Francisco may be closed and thus, the value "San Francisco" may be removed from the group of values for the attribute of job location. Alternatively, the administrator may change the relationships between some states. Referring to the employment example above, a change in company policy may allow termination of a newly hired employee. In other words, the attribute of employment status may transition from "new hire" directly to "terminated" under the new company policy.

In response to the administrator's request to change the workflow management policy, the processing device 134 may update the workflow management policy and modify the state machine 136 accordingly. For example, the processing device 134 may create additional business logic, modify some of the existing business logic, and/or remove some of the existing business logic from the state machine 136.

Using the above technique, the server 130 centralizes the management of state transitions of the attributes of the data, and thus, the workflow management policy may be easily deployed from the server 130. Further, modifications of the workflow management policy may also be readily made at the server 130, instead of making the modifications at multiple client machines. Moreover, the risk of one of the client machines 111 and 112 mistakenly violating the workflow management policy is reduced because the client machines 111 and 112 have to seek approval from the server 130 before committing a change in the attributes of the data.

Figure 2A:
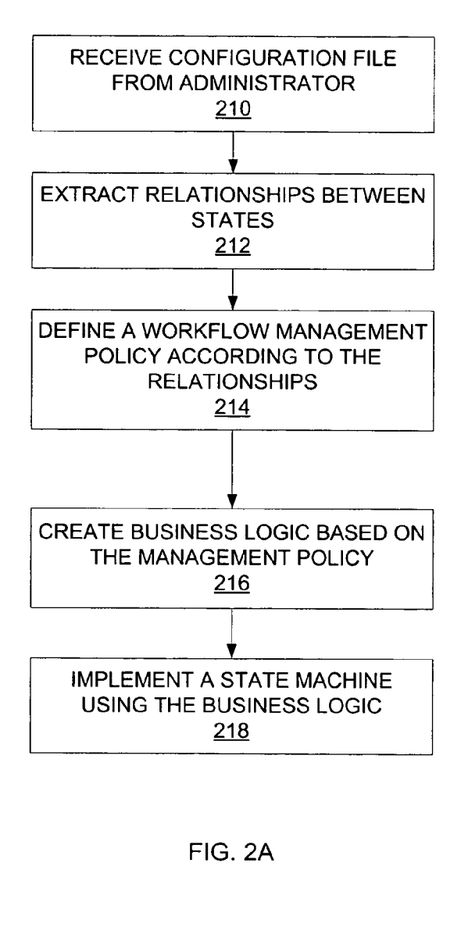
FIG. 2A illustrates a flow diagram of one embodiment of a process to implement a state machine.

FIG. 2A illustrates a flow diagram of one embodiment of a process to implement a state machine. The process may be performed by processing logic that may comprise hardware (e.g., circuitry, dedicated logic, programmable logic, microcode, etc.), software (such as instructions run on a processing device), firmware, or a combination thereof. For example, the server 130 in FIG. 1 may perform the process.

Referring to FIG. 2A, processing logic receives administrator input specifying some attributes of data processed by a system and values of the attributes (processing block 210). Processing logic may define a number of states for the attributes. In some embodiments, each value of an attribute corresponds to a state. Alternatively, each combination of values of a set of attributes corresponds to a state. Processing logic may extract relationships between the states from the administrator input (processing block 212). According to the relationships, processing logic defines a workflow management policy (processing block 214).

Furthermore, processing logic creates business logic based on the workflow management policy to govern transition among the states (processing block 216). Then processing logic implements a state machine using the business logic (processing block 218). Details of some embodiments of implementing a state machine have been described above.

Figure 2B:
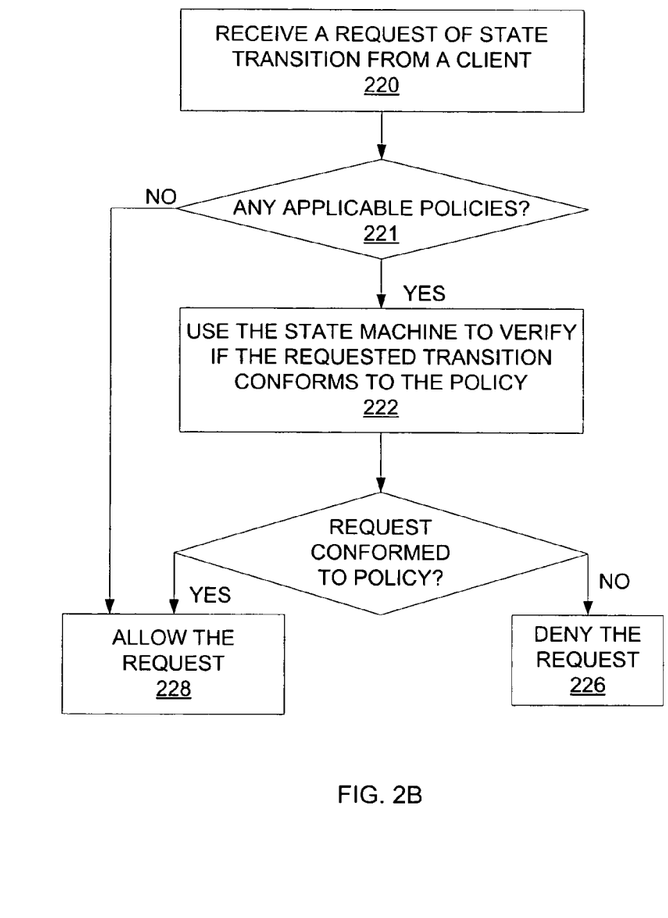
FIG. 2B illustrates a flow diagram of one embodiment of a process to manage data using a state machine.

FIG. 2B illustrates a flow diagram of one embodiment of a process to manage data using the state machine. The process may be performed by processing logic that may comprise hardware (e.g., circuitry, dedicated logic, programmable logic, microcode, etc.), software (such as instructions run on a processing device), firmware, or a combination thereof. For example, the server 130 in FIG. 1 may perform the process.

Referring to FIG. 2B, processing logic receives a request of state transition from a client (processing block 220). The state transition corresponds to a change in a value of at least one attribute of data. Some examples of changes in values of attributes have been described above. In response to the request, processing logic checks if the requested attribute(s) has any applicable policies (processing block 221). If there is no applicable policy, then processing logic transitions to processing block 228 to allow the request. Otherwise, if there is at least one applicable policy, then processing logic uses the state machine to verify if the requested transition conforms to the workflow management policy (processing block 222). If the requested transition conforms to the policy, then processing logic allows the request (processing block 228). Otherwise, if the requested transition does not conform to the policy, then processing logic denies the request (processing block 226). To further illustrate the operation of the state machine, an exemplary embodiment of a state diagram of a state machine is shown in FIG. 3.

Figure 3:
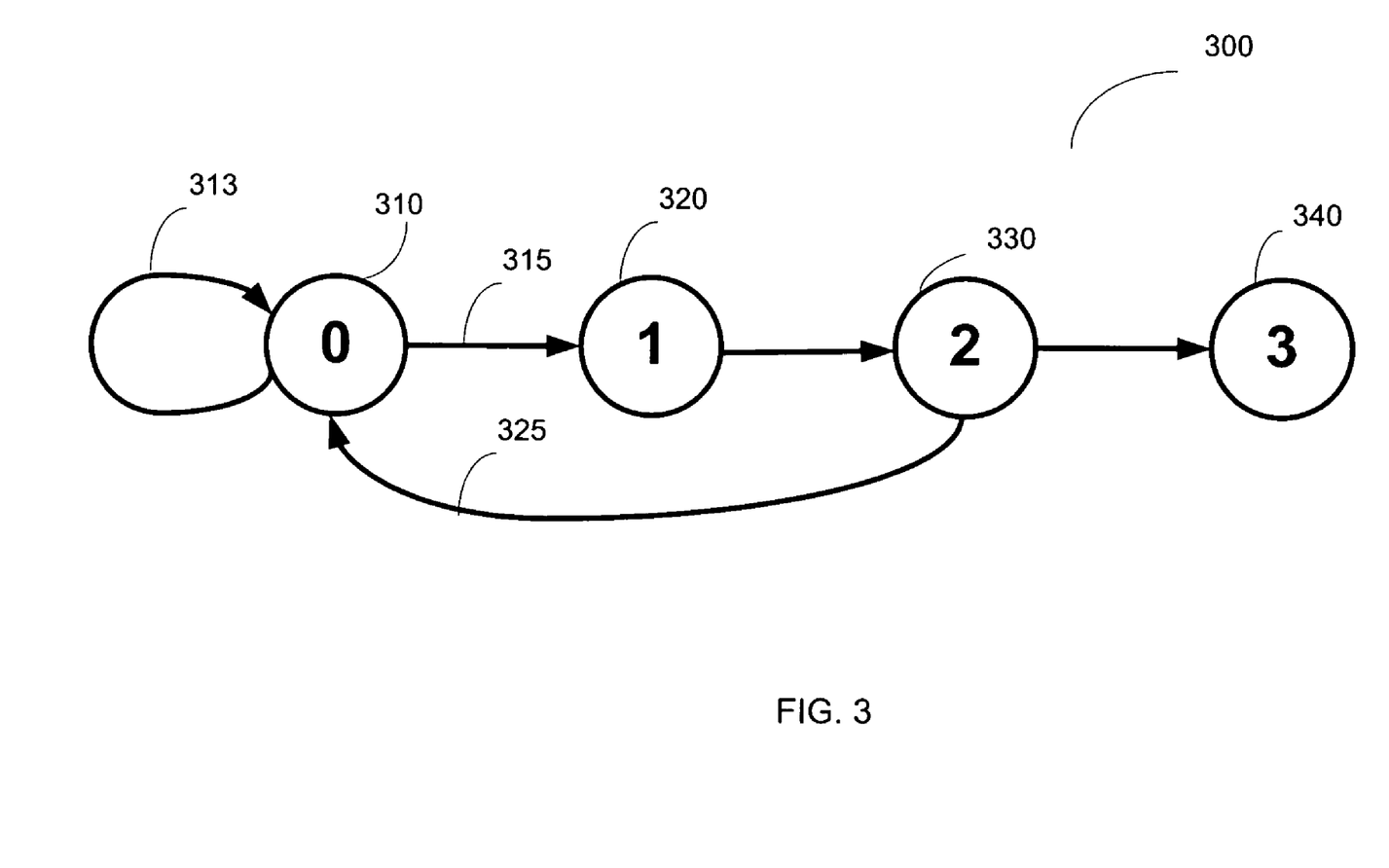
FIG. 3 illustrates one embodiment of a state diagram.

FIG. 3 illustrates one embodiment of a state diagram of a state machine. In general, the state diagram 300 illustrates all states of one or more attributes and state transitions allowed by the state machine. The state diagram 300 includes four states 310, 320, 330, and 340. Each of the state may correspond to a particular value of an attribute of data. Alternatively, each state may correspond to a particular combination of values of multiple attributes. Using the above example in employment context, state 310 may correspond to "new hire," state 320 may correspond to "active," state 330 may correspond to "inactive," and state 340 may correspond to "terminated." The arrows connecting the states indicate the transitions allowed among the states 310, 320, 330, and 340 based on the relationships between the states 310, 320, 330, and 340. Specifically, a transition from a first state to a second state is allowed if there is an arrow going from the first state to the second state. In other words, if there is no arrow going from the first state to the second state, then the transition from the first state to the second state is not allowed. For example, there is an arrow 315 going from state 310 to state 320, and thus, a transition from state 310 to state 320 is allowed. In another example, there is an arrow 325 going from state 330 to state 310, but no arrow going from state 310 to state 330. Therefore, a transition from state 330 to state 310 is allowed, but not a transition from state 310 to state 330. In some embodiments, a transition to the same state may be possible. For example, there is an arrow 313 going from state 310 back to state 310. Thus, if an attribute is in state 310, the value of the attribute may remain unchanged under some predetermined circumstances and/or conditions.

In some embodiments, an ordering value is assigned to each state based on a corresponding attribute of the data. The ordering values may indicate a particular sequence of state transitions. Referring to FIG. 3, the ordering values of the states 310, 320, 330, and 340 are 0, 1, 2, and 3, respectively. These ordering values may correspond to a typical sequence of state transitions in the above example in employment context, where an employee typically goes from being a "new hire" to being "active," and then to being "inactive," and finally to being "terminated."

Figure 4:
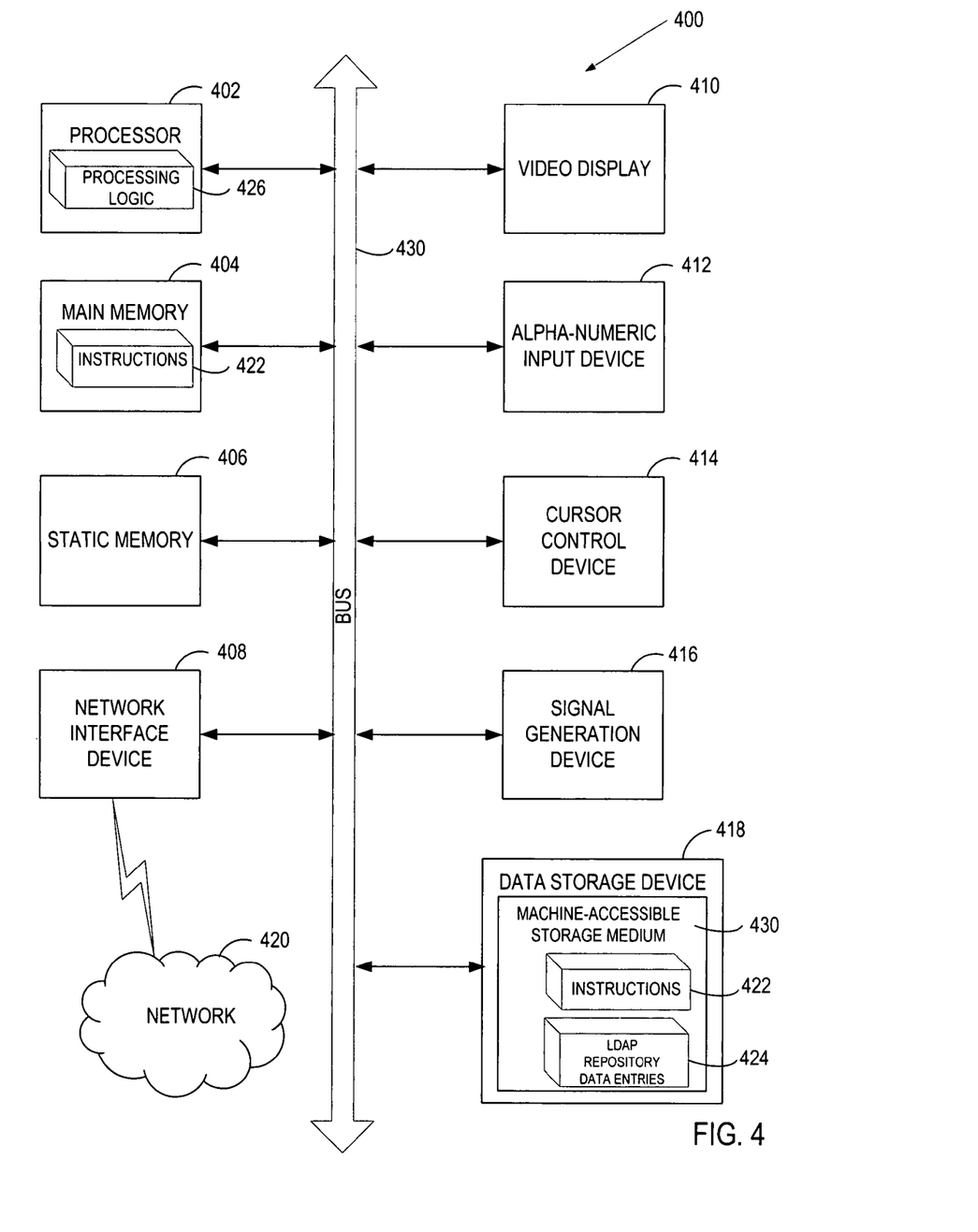
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of state transition controlled attributes have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   extracting, by a server coupled to one or more client machines, relationships between a plurality of states from a configuration data stored on the server to define a workflow management policy comprising rules on how data in a workflow is manipulated, wherein an attribute of the data has a value selected from a group of predetermined values, each of the predetermined values corresponding to a distinct one of the plurality of states and a change on the value of the attribute corresponding to a state transition; and
   implementing a state machine on the server to manage state transitions initiated by the one or more client machines operating on the data according to the workflow management policy, wherein implementing the state machine on the server to manage state transitions comprises:
      in response to a request from the one or more client machines to transition from a first state to a second state, verifying, by the server, if a transition from the first state to the second state conforms with the workflow management policy;
      allowing the request if the transition conforms with the workflow management policy; and
      denying the request if the transition violates the workflow management policy.

2. The method of claim 1, wherein implementing the state machine on the server comprises:
   creating business logic for the state machine on the server based on relationships between the plurality of states.

3. The method of claim 1, further comprising:
   receiving configuration data by the server, wherein the management policy is defined according to the configuration data.

4. The method of claim 1, further comprising:
   assigning, by the server, an ordering value to each of the plurality of states based on a corresponding value of the attribute of the data.

5. The method of claim 1, wherein each of the plurality of states corresponds to one or more events, which trigger an operation attempting to change a corresponding value of the attribute of the data.

6. The method of claim 1, further comprising:
   storing, by the server, the attribute in a lightweight directory access protocol (LDAP) directory.

7. An apparatus comprising:
   a network interface to couple a server to at least one client machine;
   a user interlace on the server to receive configuration data;
   a processing device on the server to extract relationships between a plurality of states from the configuration data stored on the server to define a workflow management policy comprising rules on how data in a workflow is manipulated, wherein an attribute of the data has a value selected from a group of predetermined values, each of the predetermined values corresponding to a distinct one of the plurality of states and a change on the value of the attribute corresponding to a state transition; and
   a state machine on the server to manage state transitions according to the workflow management policy, the state transitions initiated by the at least one client machine while processing data, wherein the state machine verifies if a transition from a first state to a second state violates the workflow management policy in response to a request from the at least one client machine to transition from the first state to the second state, and the state machine denies the request if the transition violates the management policy.

8. The apparatus of claim 7, wherein each of the plurality of states is associated with an ordering value.

9. The apparatus of claim 7, wherein each of the plurality of states corresponds to an event, which causes a corresponding attribute of the data to change.

10. A system comprising:
    a repository to store a plurality of attributes of data; and
    a server coupled to the repository and a plurality of client machines, the server comprising a first user interface to receive configuration data;
    a processing device to extract relationships between a plurality of states from the configuration data to define a workflow management policy comprising rules on how data in a workflow is manipulated, wherein an attribute of the data has a value selected from a group of predetermined values, each of the predetermined values corresponding to a distinct one of the plurality of states and a change on the value of the attribute corresponding to a state transition; and
    a state machine to manage state transitions initiated by the plurality of client machines according to the workflow management policy, wherein the state machine comprises:
       in response to a request from the one or more client machines to transition from a first state to a second state, verifying, by the server, if a transition from the first state to the second state conforms with the workflow management policy;
       allowing the request if the transition conforms with the workflow management policy; and
       denying the request if the transition violates the workflow management policy.

11. The system of claim 10, wherein the repository is a lightweight directory access protocol (LDAP) directory.

12. The system of claim 10, wherein the server further comprises:
    a second user interface to allow an administrator to modify the workflow management policy, wherein the processing device modifies the state machine in response to a change in the workflow management policy.

13. A non-transitory machine-readable storage medium for providing data instructions, executed by a processor, to cause the processor to perform operations comprising:
- extracting relationships between a plurality of states from configuration data stored on a server to define a workflow management policy comprising rules on how data in a workflow is manipulated, wherein an attribute of the data has a value selected from a group of predetermined values, each of the predetermined values corresponding to a distinct one of the plurality of states and a change on the value of the attribute corresponding to a state transition; and
- implementing a state machine on the server to manage state transitions initiated by the one or more client machines operating on the data according to the workflow management policy, wherein implementing the state machine on the server to manage state transitions comprises:
  - in response to a request from the one or more client machines to transition from a first state to a second state, verifying, by the server, if a transition from the first state to the second state conforms with the workflow management policy;
  - allowing the request if the transition conforms with the workflow management policy; and
  - denying the request if the transition violates the workflow management policy.

14. The machine-readable storage medium of claim 13, wherein implementing the state machine comprises:
- creating business logic for the state machine on the server based on relationships between the plurality of states.

15. The machine-readable storage medium of claim 13, wherein the operations further comprise:
- receiving configuration data at the server, wherein the management policy is defined according to the configuration data.

16. The machine-readable storage medium of claim 13, wherein the operations further comprise:
- assigning an ordering value to each of the plurality of states based on a corresponding value of the attribute of the data.

17. The machine-readable storage medium of claim 13, wherein each of the plurality of states corresponds to one or more events, which trigger an operation attempting to change a corresponding value of the attribute of the data.

18. The machine-readable storage medium of claim 13, wherein the operations further comprise:
- storing the attribute in a lightweight directory access protocol (LDAP) directory.

* * * * *